Patented Sept. 2, 1930

1,774,585

UNITED STATES PATENT OFFICE

OSCAR L. BARNEBEY, OF COLUMBUS, OHIO

PROCESS FOR THE MANUFACTURE OF ADSORBENT CARBONS

No Drawing. Application filed November 6, 1924, Serial No. 748,274. Renewed December 14, 1927.

My invention relates to a process of treating carbonaceous materials to convert said materials into products possessing high decolorizing and adsorbent capacity, said products to be used in refining of syrups, oils and other liquids as well as various other purposes for which adsorbent carbons can be applied.

The chief object of the present invention is the production of a highly effective material of the character referred to, by a process applicable to a wide variety of raw materials and of such a nature that valuable by-products can be recovered.

Briefly stated, the process comprises the carbonizing of suitable carbonaceous raw material, extracting soluble material therefrom with a suitable solvent or solvents, heating the carbonized material in the presence of oxygenated gases to increase its porosity and adsorptive capacity and removing ash constituents from the resulting carbon.

In carrying out the process, the manufacturing treatment preferably includes carbonizing the carbonaceous material, extracting said carbonized material with a solvent to dissolve out tarry and resinous matter, recovering and refining the extracted matters by evaporation and recovery of the solvent and distillation of the extracted materials, treatment of the extracted carbonized material to remove retained solvent, treatment of the resultant carbon material with oxygenated gases, such as steam, carbon dioxide, combustion gases, or other gases in which oxygen is chemically combined with another element similar to $H_2O$ or $CO_2$, then dissolving a substantial proportion of the ash constituents from the treated material, such extraction or removal of ash constituents being accomplished by the appropriate chemical treatment which usually consists of treatment with acids to remove basic ingredients and treatment with an alkali to remove acid ingredients of the nature of silica.

The process is applicable to a large number of carbonaceous materials. Varying the procedure herein outlined slightly within the spirit of the disclosure allows a very large number of materials to be treated by this process. When the material to be treated is essentially the original vegetable material the first step of the process is to carbonize the vegetable material. Other raw materials, especially natural materials such as certain qualities of coal, peat or lignite, or artificial materials of similar character produced in industrial operations, have already been carbonized and in consequence of the same the first step of the process may be eliminated. Such materials are treated directly in accordance with the second step with the solvent to remove tarry or other extractable materials after which the resultant solid material is treated with oxygenated gases and given a chemical treatment to remove ash constituents.

While many materials can be used in the operation of this process the following are mentioned specifically: bituminous coal, lignite, oil shale, and other similar natural materials, husks, leaves, grains and straw, vines or stalks from various plants, wood and other similar materials including waste products like sawdust, in fact any carbonaceous material which will furnish carbon by charring and which contains a substantial proportion of extractable tarry or resinous organic material for the solvent extraction and in certain cases also contains a substantial proportion of extractable mineral matter remaining after the solvent extraction.

In my copending application Serial No. 485,386, filed July 16, 1921, a method has been described for the manufacture of decolorizing carbon involving the treatment of carbonaceous material by carbonizing vegetable material, treating the carbonized material with oxygenated gases and removal of mineral ash constituents. The present invention includes the additional step of extracting the carbonized material with suitable solvents and thus makes possible a recovery in useful form of constituents of the raw material that was not realized in the other process, while at the same time the finished carbon produced has a high adsorptive capacity. The invention preferably is carried out in accordance with the following:

1. In conducting the first step the carbonaceous material must be charred to produce the carbon.

2. The charring must be performed at a sufficiently low temperature to produce a large proportion of the carbon in the form of amorphous carbon and contain no inactive or graphitic carbon.

3. To satisfy the second consideration the charring is conducted in such a manner as to leave a substantial percentage of the carbon in the form of organic compounds which are extractable by solvents hereinafter described.

4. The carbonized material is then extracted and purified of soluble resins, tars or other organic compounds, using an appropriate solvent.

5. After removal of soluble organic compounds the resultant material is treated with oxygenated gases to render porous and increase the surface areas of carbon available for contact with the liquids or solutions to be decolorized or acted upon by the adsorbent carbon.

6. The carbon is processed further to remove inorganic basic constituents such as oxides or oxide compounds by extraction with mineral acids.

7. A further treatment or step is used to remove acid constituents such as silica and acid silicates by treatment with an alkali.

8. After the above treatments with acid and alkali the final carbon is washed thoroughly to remove any excess of treating agents and leave the carbon in a highly purified form.

9. Ordinarily, after the treatment with aqueous solutions of acid or alkali and washing the moisture is removed from the carbon to leave the carbon in a dry state.

10. The final finished carbon is to be free from impurities, and the carbon is to possess a very active surface.

I perform the first step of my process by charring the carbonaceous material ordinarily at temperatures from 500 to 700° C. The temperature range may be extended as low as 350° C. and as high as 900° C. or more. When the temperature is low a relatively longer time is used for charring than is the case when the temperature is higher. The temperature used and the time of retorting are so regulated as to leave from 10 to 40% of tarry or resinous matter by weight of carbonaceous material in the carbonized material at the end of the charring period in the best operation of my process. In some cases, however, I prefer to retort at high temperatures and for a relatively long time to remove or decompose almost all of the tarry and resinous matter. However, there is always left in the carbonaceous material a sufficient quantity of extractable material to permit a substantial solvent extraction.

The second step of my process, consisting in the solvent extraction of soluble organic compounds, is ordinarily carried out at ordinary temperatures. However, the solvents may be warm or hot during the extraction period. While several solvents have been used to advantage including such solvents as carbon tetrachloride and other organic halides, hydro-carbons of the nature of kerosene and gasoline as well as other organic solvents of the generally accepted types, the best solvent which has been found is one which contains nitrogen in carbocyclic series, the best one of the series being pyridine. Quinoline is likewise a very useful solvent in this same series. Of the various members of the series pyridine is preferred since it has a very high extractive power for the tarry and resinous matters and further its physical properties, most particularly its boiling point, make this solvent easily recovable so that the solvent can be used over and over again continuously.

In operation of the solvent extraction step the charred material is charged into towers and subjected to an extraction with the pyridine or similar acting solvent. The solvent removes the extractable material best by treatment in batches, the treatment being conducted in such a manner as to add fresh solvent to previously treated material which has undergone partial extraction. By dividing the operation into four to six steps, gradually increasing the concentration of extracted material in each batch treatment and finishing the extraction of each batch of carbonaceous material with fresh solvent there is a maximum utilization of the solvent and there is obtained a high concentration of extractable material in the solvent. When the solvent is fully used and a high concentration of extractable material obtained the liquid is distilled in such a manner as to fractionally remove the solvent from the tarry material and after the solvent has been removed the temperature of distillation is increased and the tarry material fractionally distilled to obtain the component parts of the tarry and resinous organic material, such being marketed in accordance with the fractions obtained, as "light oil", "middle oil", "heavy oil", "anthracene oil", "pitch" or other more refined products of distillation such as benzol, toluol, xylol, cresol, phenol, etc. The distilled solvent is then used back with future batches of carbonized material, thus using the solvent over again and again in a continuous manner.

Instead of using the batch operation as outlined above a continuous extraction can be utilized wherein the carbonized material to be extracted is added in a counter current manner to the flow of extracting solvent, thus contacting continuously the fresh solvent with the finished material and removing the solvent saturated with extractable material at the point of intake of carbonized material.

In this case likewise the solvent is distilled off and utilized over and over again continuously.

The third step of the process, namely treating with oxygenated gases, is performed at temperatures usually ranging from 500 to 900° C. and within this range the usual limits are from 700° to 900° C., although temperatures in certain cases may be higher or lower than the figures mentioned. In ordinary cases temperatures lower than the range mentioned give too slow an action for practical operation and temperatures very much higher ordinarily give too rapid action between the oxygenated gases and the carbon, thus causing wastage of carbonaceous material and loss in yield of final product. Ordinarily it has been found that steam distillation of the carbonaceous material previous to the treatment of the oxygenated gases is highly desirable, in order to remove completely the pyridine which has been retained with the particles of carbon, thus saving the loss of solvent. While direct distillation of the pyridine can likewise be effected it has been found best to remove the pyridine with steam. Steam distillation takes place at relatively low temperatures. The pyridine thus obtained is condensed and added to the regular process pyridine as used in the regular operation.

The fourth step involving the purification of the carbon surfaces to produce clean reactive carbon utilizes specific chemicals which have the specific solubility for the mineral ash constituents of the particular raw material being treated. When the ash constituents are soluble in water no other agent need be used than water to dissolve out the ash constituents. When highly silicious ash constituents are contained in the carbonaceous material a treatment with alkali such as caustic soda is desirable.

If the ash constituents are highly basic an acid is used to dissolve the same to free the carbon surfaces from impurities. The common mineral acids, hydrochloric and sulphuric acid are most generally applicable for the acid treatment, although the process is not limited to these two acids. Where only such basic compounds as calcium carbonate are to be dissolved by the acid only dilute acid is necessary, i. e. only a percentage such as one or two percent hydrochloric sufficing. However, to dissolve some basic compounds, such as oxide of iron or metallic iron, a higher acid concentration is required, for instance five, ten or even twenty percent acid being required. A very excellent acid is a mixture of hydrofluoric and sulphuric acids and such a solution is best used hot.

Sometimes a combination of both acids and alkalis is desirable to remove the impurities, coating or covering up the carbon surfaces. When both alkali and acid treatments are required ordinarily the best procedure is to treat with alkali first since the acid treatment following the alkali treatment functions in two ways, namely to dissolve the basic constituents as previously mentioned and to remove the excess of alkali. It is much easier to remove the alkali with an acid treatment than to wash the alkali free from the carbon with water alone. When both acid and alkali treatments are used care must be exercised to wash the carbon as free as possible with water to remove the bulk of the first used acid or alkali in order to avoid wasting the second reagent added. Another advantage of using the acid treatment after the alkali treatment is that an acid solution filters much more rapidly than does an alkali solution and allows more rapid final washing of the carbon from all soluble impurities. Usually the acid and alkali treatments are preferred with warm or hot solutions to obtain the best purification.

On account of its cheapness at present, caustic soda is one of the best alkalis to use, although sodium carbonate, caustic potash and other alkalis are applicable. In fact, fusion with sodium carbonate produces an equally good result but ordinarily such fusion is not justified on account of the additional expense incurred thereby. When caustic soda is used in solution the strength of solution usually used is from ten to thirty percent. Solutions of five to ten percent strength are less applicable as reaction is slower and while they can still be used, two to five percent solutions are far less desirable. Below two percent the reaction is too slow to be of value.

The final carbon is washed thoroughly and dried, the drying being preferably performed at about 500° C. although a much lower temperature will suffice for all but the most active carbons. Heating to about 900° C. also improves the quality of the carbon.

If the third treatment with oxygenated gases has not been carried far enough to yield the highest quality of product it is sometimes desirable to treat the extracted material a second time with the oxygenated gases. However, such can only be done in cases where the extraction has been sufficiently efficient to remove the ash constituents from the carbon substantially completely, otherwise new surfaces coated with ash constituents will be exposed and yield an inferior carbon, unless the carbon is treated a second time to remove the ash constituents thus exposed. When this is done, however, a very high grade carbon results.

My invention is still further explained by the following examples:

*Example No. 1.*—Cannel coal containing approximately 50 to 60% fixed carbon, 20 to 30% extractable tarry matter and 20% ash constituents is a good raw material for my process. The coal is suitably pulverized and extracted with pyridine to remove the soluble matter after which the retained pyridine is removed by ordinary steam distillation. The pyridine extraction liquid containing the tarry matters is fractionally distilled to recover the pyridine and separate the tarry matter into its constituents. The steamed carbon is then treated with steam at approximately temperatures of 900° C. to remove approximately 20% by weight of carbon content. This treatment is followed by a treatment with a hot mixture of hydrofluoric and hydrochloric acids to remove the ash constituents. The carbon is then thoroughly washed and dried producing a high grade product.

*Example No. 2.*—Saw dust is carbonized at temperatures between 350 and 500° C. to yield a crude charcoal containing 10 to 40% of solvent extractable matter. This crude charcoal is extracted with pyridine as in Example 1. The carbon is steam distilled to remove retained pyridine and treated at 850° C. with a mixture of steam and carbon dioxide until a loss of 30% by weight has occurred. The oxygenated gas treated carbon is then further treated with warm 5% hydrochloric acid solution. After washing thoroughly with water and heating to redness for drying an excellent product results.

The above description and examples are given as indicating the application of my invention. With any specific carbonaceous material the temperature and time of charring, the specific solvent used and manner of extraction, the temperature and time of treatment with oxygenated gases, and choice of chemicals with which to remove the ash constituents as well as the concentration and use of the same are determined by empirically treating within the description and outlines herein specified and the best condition is used for manufacture with the specific material. Not all materials are equally applicable, hence the best available material is chosen for processing. This choice of material is also determined empirically. However, the invention is not limited to the particular details enumerated above, since many variations can be made within the spirit of the invention without departing from the scope of the invention, the only limitations being those defined by the following claims.

I claim:

1. The process of manufacturing adsorbent carbon, comprising carbonizing carbonaceous material, extracting soluble material with a solvent, heating the carbonized material with oxzgenated gases and removing ash constituents from the carbon.

2. The process of manufacturing adsorbent carbon, comprising carbonizing carbonaceous material at temperatures between 350° C. and 900° C., extracting soluble material with a solvent, heating the carbonized material with oxygenated gases at temperatures between 500° C. and 900° C., and removing a substantial percentage of ash constituents from the carbon.

3. The process of manufacturing adsorbent carbon, comprising carbonizing carbonaceous material at temperatures between 350° C. and 900° C., extracting soluble material with a solvent, heating the carbonized material with oxygenated gases at temperatures between 700° C. and 900° C., and removing a substantial percentage of ash constituents from the carbon.

4. The process of manufacturing adsorbent carbon, comprising carbonizing carbonaceous material until the tarry and resinous matter content becomes not less than ten percent of the total carbonaceous content of the carbonized material, extracting soluble material with a solvent, heating the carbonized material with oxygenated gases and removing ash constituents from the carbon.

5. The process of manufacturing adsorbent carbon comprising carbonizing carbonaceous material until the tarry and resinous matter content becomes not more than forty percent of the total carbonaceous content of carbonized material, extracting soluble material with a solvent, heating the carbonized material with oxygenated gases and removing ash constituents from the carbon.

6. The process of manufacturing adsorbent carbon comprising carbonizing carbonaceous material until the tarry and resinous matter content is between ten percent and forty percent of the total carbonaceous content of the carbonized material, extracting soluble material with a solvent, heating the carbonized material in the presence of oxygenated gases until a substantial percentage of carbon has been removed, and removing ash constituents from the carbon.

7. The process of manufacturing adsorbent carbon comprising carbonizing carbonaceous material at temperatures between 350° C. and 900° C. until the tarry and resinous content is between ten percent and forty percent of the total carbonaceous content of the carbonized material, extracting soluble material with a solvent, heating to temperatures between 500° and 900° C. in the presence of oxygenated gases until a substantial percentage of carbon has been removed, extracting silica with caustic soda solution containing over five percent sodium hydroxide by weight and extracting the base ingredients with a solution containing over two percent hydrochloric acid by weight.

8. The process of manufacturing adsorbent carbon comprising carbonizing carbonaceous material at temperatures between 350° C. and 900° C. until the tarry and resinous matter content is between ten percent and forty percent of the total carbonaceous content of the carbonized material, extracting soluble material with a solvent, heating to temperatures between 500° C. and 900° C. in the presence of oxygenated gases until a substantial percentage of carbon has been removed, extracting silica with caustic soda solution containing over five percent sodium hydroxide by weight and extracting the base ingredients with a solution containing over five percent hydrochloric acid by weight.

9. The process of manufacturing adsorbent carbon comprising carbonizing carbonaceous material at temperatures between 350° and 900° C. until the tarry and resinous matter content is between ten and forty percent of the total carbonaceous content of the carbonized material, extracting soluble material with a solvent, heating the carbonized material at a temperature between 500° and 900° C. in the presence of oxygenated gases until a substantial percentage of carbon has been removed, and removing ash constituents from the carbon.

10. The process of manufacturing decolorizing and adsorbent carbon, comprising carbonizing carbonaceous material, extracting soluble material therefrom with a solvent consisting of an organic nitrogen compound, heating the carbonized material with oxygenated gases to increase its porosity and adsorptive capacity, and removing ash constitutents from the carbon.

11. The process of manufacturing decolorizing and adsorbent carbon, comprising carbonizing carbonaceous material, extracting soluble material therefrom with pyridine, heating the carbonized material with oxygenated gases to increase its porosity and adsorptive capacity, and removing ash constituents from the carbon.

In testimony whereof, I affix my signature.

OSCAR L. BARNEBEY.